Patented Dec. 4, 1951

2,577,256

UNITED STATES PATENT OFFICE 2,577,256

POLYOXYPROPYLENE-BENZENE-SULFONAMIDES

Lester G. Lundsted, Grosse Ile, Mich., assignor to Wyandotte Chemicals Corporation, Wyandotte, Mich., a corporation of Michigan No Drawing. Application April 9, 1949, Serial No. 86,588

14 Claims. (Cl. 260—556)

The present invention relates to a new type of nitrogen substituted aryl sulfonamides, in which one amide hydrogen atom is replaced with one or more oxyalkylene groups or in which both amide hydrogen atoms are replaced with one or more oxyalkylene groups. The compounds of my invention may be alternatively defined as N-polyoxyalkylene aryl sulfonamides, wherein the aryl group is derived from benzene and its lower aliphatically C-substituted homologues, such as toluene, xylene, mesitylene, durene, ethylbenzene, cumene and cymene. These new compounds correspond to the following type formula:

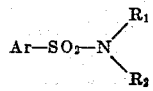

where—
Ar is an aromatic radical of the benzene series,
R₁ is a lower alkyl, monooxyalkylene or poly-oxyalkylene, and
R₂ is a monooxyalkylene or polyoxyalkylene.

Compounds of my invention wherein N-polyoxyalkylene groups are present have been found to be particularly valuable in possessing low melting points and low volatility at elevated temperatures. They are illustrated by the following type formulae:

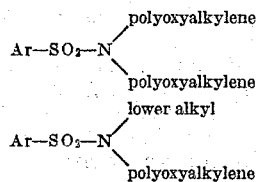

Preferably, the lower alkyl group in the above stated formulae is one containing up to 4 carbon atoms and derived from either a straight or branched chain alkane; and the oxyalkylene group is preferably polyoxypropylene, present in the amount 2-8 propenoxy groups. (The term "polyoxypropylene" as herein employed in both the specification and claims refers of course to a group having an acyclic chemical structure and a terminal hydroxyl radical.)

The new compounds of my invention are particularly suitable as plasticizing agents for synthetic resins, especially resins of the vinyl type. In the search for synthetic resin plasticizing compounds, it has generally been the objective to obtain the following desired physical properties:

(1) High resistance to moisture, which necessarily means that the compound be strongly hydrophobic, (2) High heat stability, which means that the compound be of relatively low volatility, and (3) Liquid at normal temperatures.

Referring more specifically to the N-alkyl benzenesulfonamides of the prior art (Beilstein, vol. 11, pp. 39–42, 1928) it will be seen, for example, that mono-N-ethyl benzenesulfonamide is a solid having a melting point of 57–58° C. and that it is soluble in weakly alkaline aqueous solution. And even where the substituent is an N-alkoxyalkyl group, the resultant compound, such as mono-methoxypropyl toluene sulfonamide, is soluble in dilute NaOH solution and of normally solid form. cf. U. S. Pat. No. 2,071,917. So also, is mono-N-n-butyl toluenesulfonamide a solid having a melting point of 42–43° C.

However, when the replaceable hydrogen atom on the nitrogen atom of mono-N-ethyl benzenesulfonamide, for example, is substituted with an oxyalkylene group, such as a polyoxypropylene group, the resultant compound is found to be a liquid at normal temperatures, which liquid is strongly hydrophobic and capable of being heated to temperatures on the order of 170° C. under 5 millimeters of Hg pressure without distillation or decomposition.

The achievement of such properties in the compounds of my invention is particularly unusual and unexpected when it is considered that the lower alkylene oxides and gylcols themselves are quite readily water-soluble; and that the alkylene oxide condensation or modification of other benzenesulfonamides, such as the oleyl-benzenesulfonamide of U. S. Pat. No. 2,131,142, modified with ethylene oxide, produces a compound which is an excellent wetting agent, thereby being of a strongly hydrophilic nature.

The following examples will serve to illustrate my invention in greater detail:

*Example 1*

In a 2 liter 3-neck round bottom flask fitted with a mechanical stirrer working through a packing gland, a reflux condenser topped by a Dry Ice condenser connected to a mercury blow-off valve, a thermometer and a capillary inlet for oxide feed, there was placed 740 grams of N-ethyl benzenesulfonamide and 0.22 weight percent of sodium hydroxide based on the weight of amide. The stirrer was started and heat applied to the mixture while a stream of nitrogen was passed through the flask to displace air. When the temperature reached 160° C. the nitrogen feed was removed and a reservoir of propylene oxide connected to the capillary feed line. The nitrogen in the reaction flask was displaced with propylene oxide vapor and then the addition of propylene oxide continued at the rate at which reaction took place. A total of 879.9 grams of propylene oxide was added to the reaction mixture in the course of 11.8 hours while the temperature was maintained at an average temperature of 150° C.

The average rate of addition of the propylene oxide corresponds to 0.32 mol per mol of amide per hour. This corresponded to a total addition of 3.8 mols of propylene oxide per mol of N-ethyl benzenesulfonamide. At the conclusion of the reaction the propylene oxide feed was replaced with a stream of nitrogen and the reaction mixture cooled to room temperature. The sodium hydroxide catalyst was neutralized by bubbling carbon dioxide gas into the mixture after which the product was heated to 170° C. at approximately 10 mm. to remove volatile materials. The residue was filtered hot to yield 1535.3 grams (94.8%) of a product having a molecular weight of 384 by nitrogen determination, the theoretical molecular weight, based on the amount of propylene oxide addition, being 405.

*Example 2*

The reaction was carried out as in Example 1 but N-ethyl benzenesulfonamide was replaced by benzenesulfonamide. From 314 grams of benzenesulfonamide and 998.2 grams of propylene oxide (corresponding to 8.1 mols per mol of benzenesulfonamide), in the presence of 0.57 weight percent of sodium hydroxide based on the amide, at an average temperature of 150° C., there was obtained 1196.3 grams (91.2%) of a product showing a molecular weight of 635 on the basis of nitrogen analysis, the calculated molecular weight, based on the amount of propylene oxide addition, being 656. The product was not volatile at 155° C. and 5 mm. of mercury pressure. It was not soluble in aqueous alkaline solution, thus indicating that both hydrogen atoms on the nitrogen had been replaced and that the compound was a N-N-di-polyoxypropylene benzenesulfonamide.

*Example 3*

A two gallon stainless steel autoclave was charged with 1850 grams of N-ethyl benzenesulfonamide and 1.08 weight percent of sodium hydroxide based on the amide. Air was displaced by nitrogen, the autoclave sealed and heated to 145° C. A total of 2320 grams of propylene oxide (corresponding to 4.0 mols per mol of amide) was pumped into the reaction at such a rate as to maintain an average pressure of 18 p. s. i. gauge. At the conclusion of the reaction, when the pressure had dropped to zero, the product in the autoclave was blown and worked up in the same manner as in Example 1 except that the catalyst was neutralized with 50% sulfuric acid. The product weighed 3982 grams, corresponding to a yield of 95.5% based on the weight of the starting materials. The determined molecular weight of the product by nitrogen analysis was 402, as compared to a calculated molecular weight of 417.

*Example 4*

A 300 ml. rocking bomb type reactor was charged with 314 grams of benzenesulfonamide and 0.29% by weight (amide basis) of caustic soda. After displacement of the air in the autoclave and heating to 185° C., 93.9 grams of ethylene oxide (corresponding to 1.06 mols per mol of amide) was pumped in at such rate as to maintain a pressure of 15–75 p. s. i. gauge. The ethylene oxide was added over a period of 1 hour and 5 minutes. The product weighed 375.2 grams corresponding to a 92% yield. The molecular weight of the product was found to be 322 by hydroxyl number determination and 203 by nitrogen analysis, the calculated molecular weight being 240.

*Example 5*

The reaction was carried out as in Example 1 but using 157.2 grams of benzenesulfonamide in place of the N-ethyl benzenesulfonamide. A total of 781 grams of propylene oxide (corresponding to 13.5 mols per mol of amide) was added at an average temperature of 185° C. to produce 820.3 grams of product. The product was washed three times with approximately equal quantities of water and then dehydrated under vacuum. After this treatment the product showed a molecular weight of 788 by nitrogen analysis and 740 by hydroxyl number determination; the calculated molecular weight being 938.

From the foregoing examples, it will be seen that excellent yields as well as a highly efficient degree of condensation (determined molecular weights as compared to calculated molecular weights) are obtained by my process of synthesizing the alkylene oxide modified aryl sulfonamides.

Variation in the amount of propylene oxide substituted in the aryl sulfonamides is further illustrated by the following examples, which are here set forth in tabular form for the purpose of convenience in description:

| Example | Starting Material, $C_6H_5SO_2NHR$ R= | Weight, grams | Propylene Oxide, g. | Molar Ratio, Oxide/-H | NaOH Catalyst, Weight Per cent of Amide | Time of Addition, hrs. | Average Rate of Addition Mols/Mol/hr. | Avg. Temp., °C. | Crude Product g. | Crude Product Per Cent | Mol. Wt. Calculated from Oxide Added | Mol. Wt. Found OH No. | Mol. Wt. From Per Cent N |
|---|---|---|---|---|---|---|---|---|---|---|---|---|---|
| PROPYLENE OXIDE-MODIFIED BENZENESULFONAMIDES | | | | | | | | | | | | | |
| 6 | H | 785 | 736 | 2.54 | 0.25 | 15:41 | 0.16 | 175 | 1,490 | 98 | 304 | 369 | 314 |
| 7 | ethyl | 185 | 143.5 | 2.50 | 0.27 | 1:12 | 2.08 | 141–194 | 317.8 | 97 | 328.5 | 358 | 313 |
| 8 | butyl | 213 | 232 | 4.0 | 1 | 2:50 | 1.42 | 143 | 441.7 | 99.4 | 445 | 379 | 413 |
| 9 | do | 53.3 | 33.8 | 2.32 | 0.37 | 1:55 | 1.22 | 115–145 | 87 | 100 | 388 | not analyzed | |
| PROPYLENE OXIDE-MODIFIED HOMOLOGUES OF BENZENESULFONAMIDE | | | | | | | | | | | | | |
| 10 | p-xylene sulfonamide | 100 | 125.5 | 4.0 | 1 | 5:45 | 0.695 | 170 | 223.5 | 99.3 | 417 | 392 | 490 |
| 11 | p-toluene sulfonamide | 171 | 232 | 4 | 1 | 4:20 | 0.925 | 154 | 403 | 100 | 403 | 390 | 466 |
| 12 | N-ethyl o-, p-toluene sulfonamide | 201 | 174 | 3 | 1 | 2:40 | 1.124 | 152 | 373 | 99.6 | 375 | 351 | 412 |

NOTE: All reactions carried out at atmospheric pressure.

It will be noted from the data in the foregoing tabular form of examples, that from 0.21% of NaOH catalyst (on the basis of amide present) to 2.28% is operable in the synthesizing process; and the temperature of the reaction is preferably in the range of 115-185° C.

Other alkylene oxide condensation catalysts may be employed such as other caustic alkalis, sodium alcoholates, and amines.

It is well known that the theoretical or calculated molecular weights of alkylene oxide addition and condensation products vary greatly from those determined by analysis, and often according to the particular method of analysis. It will be noted, however, from the data hereinabove given in Examples 1-12, that the molecular weights as determined by the alternative hydroxyl number and nitrogen analyses were in exceptionally close agreement with the theoretical value calculated on the basis of starting materials. Thus, in all cases except Example 5, (wherein the highest amount of propylene oxide was added) the respective analytical molecular weight values either "bracketed" the calculated value or the nitrogen analysis value was within plus or minus 7% of the calculated value. This latter observation further testifies to the high efficiency of the reaction of my invention.

Other modes of applying the principle of my invention may be employed, changes being made as regards to the details described, provided the features stated in any of the following claims or the equivalent of such be employed.

I, therefore, particularly point out and distinctly claim as my invention:

1. N,N - di-polyoxypropylene benzenesulfonamide.
2. N-ethyl, N-polyoxypropylene benzenesulfonamide.
3. N-mono n-butyl, N-polyoxypropylene benzenesulfonamide.
4. N-ethyl, N-polyoxypropylene benzenesulfonamide in which the polyoxypropylene group contains 2-8 oxypropylene groups.
5. N-mono n-butyl, N-polyoxypropylene benzenesulfonamide wherein the polyoxypropylene group contains from 2 to 8 oxypropylene groups.
6. Alkylene oxide-modified aryl sulfonamides of the type formula:

$$Ar-SO_2-N\begin{matrix}R_1\\R_2\end{matrix}$$

where—

Ar is an aromatic hydrocarbon radical of the group consisting of benzene and alkyl substituted benzene containing up to a total of 4 carbon atoms in the alkyl portion, $R_1$ is selected from the group consisting of lower alkyl and polyoxypropylene, and $R_2$ is polyoxypropylene.

7. N-ethyl, N-polyoxypropylene benzenesulfonamide wherein the polyoxypropylene group contains an average of from 1-13.5 oxypropylene groups.

8. N-mono, n-butyl, N-polyoxypropylene benzenesulfonamide wherein the polyoxypropylene group contains an average of from 1-13.5 oxypropylene groups.

9. Compounds as defined in claim 1 wherein the polyoxypropylene groups together contain a total of from 2-27 oxypropylene groups.

10. Compounds as defined in claim 1 wherein the polyoxypropylene groups together contain a total of from 4-16 oxypropylene groups.

11. N-ethyl, N-polyoxypropylene p-toluenesulfonamide.

12. Compounds as defined in claim 11 wherein the polyoxypropylene group contains from 2-8 oxypropylene groups.

13. N,N-di-polyoxypropylene p-xylenesulfonamide.

14. Compounds as defined in claim 13 wherein the polyoxypropylene groups together contain a total of from 4-16 oxypropylene groups.

LESTER G. LUNDSTED.

REFERENCES CITED

The following references are of record in the file of this patent:

UNITED STATES PATENTS

| Number | Name | Date |
|---|---|---|
| 2,002,613 | Orthner et al. | May 18, 1935 |
| 2,093,947 | Albrecht | Sept. 21, 1937 |
| 2,138,934 | Moss | Dec. 6, 1938 |
| 2,187,823 | Ulrich et al. | Jan. 23, 1940 |
| 2,344,978 | De Groote | Mar. 28, 1944 |

FOREIGN PATENTS

| Number | Country | Date |
|---|---|---|
| 380,851 | Great Britain | Sept. 12, 1932 |
| 420,883 | Great Britain | Dec. 3, 1934 |
| 799,220 | France | Mar. 27, 1936 |
| 236,163 | Switzerland | June 1, 1945 |
| 682,390 | Germany | Sept. 28, 1939 |